April 14, 1959  G. J. BOSROCK ET AL  2,881,946
FOLDABLE CARRIER FOR BOTTLES AND THE LIKE
Filed Dec. 24, 1956  7 Sheets-Sheet 3

INVENTOR
G. J. Bosrock & C. E. Hook.
BY Roy A. Plant
ATTORNEY

April 14, 1959 G. J. BOSROCK ET AL 2,881,946
FOLDABLE CARRIER FOR BOTTLES AND THE LIKE
Filed Dec. 24, 1956 7 Sheets-Sheet 4

Fig. 6.

INVENTOR
G. J. Bosrock & C. E. Hook.
BY Roy A. Plant
ATTORNEY

April 14, 1959 G. J. BOSROCK ET AL 2,881,946
FOLDABLE CARRIER FOR BOTTLES AND THE LIKE
Filed Dec. 24, 1956 7 Sheets-Sheet 6

INVENTOR
G. J. Bosrock & C. E. Hook.

BY Roy A. Plant
ATTORNEY

April 14, 1959 G. J. BOSROCK ET AL 2,881,946
FOLDABLE CARRIER FOR BOTTLES AND THE LIKE
Filed Dec. 24, 1956 7 Sheets-Sheet 7

INVENTOR
G. J. Bosrock & C. E. Hook.
BY Roy A. Plant
ATTORNEY

United States Patent Office 2,881,946
Patented Apr. 14, 1959

2,881,946

FOLDABLE CARRIER FOR BOTTLES AND THE LIKE

George J. Bosrock and Charles E. Hook, Battle Creek, Mich., assignors to Michigan Carton Co., Battle Creek, Mich., a corporation of Michigan Application December 24, 1956, Serial No. 630,162

4 Claims. (Cl. 220—113)

The present invention relates broadly to carriers, and in its specific phases to a foldable paperboard carrier for bottles or the like.

The present new and improved bottle carrier, which is preferably formed from cardboard or the like, is of a form which facilitates the carrying of bottled beverages from a store to the home or elsewhere. Customarily, a number of filled carriers for this general purpose are kept on display in the store ready for sale, and when a purchaser returns the empty bottles and the carrier, the bottles and carrier are returned to the bottling plant where the carrier is kept for further use. Storage of unfolded empty carriers requires a relatively large amount of space and they cannot be usually piled in orderly manner. Such conditions have shown the advisability of providing collapsible carriers, and while attempts have been heretofore made to supply this need, most of such carriers have been either too frail to be serviceable for any period of time or have been too complicated to permit expeditious manufacture and sale at a reasonable price. It was a recognition of this problem and the lack of any wholly satisfactory solution to same which led to the conception and development of the present invention.

Accordingly among the objects of the present invention is the overcoming of the prior shortcoming of the carrier art and the provision of a relatively simple and inexpensive foldable carrier of considerably more than ample strength.

Another object is to produce a foldable paperboard carrier which is readily formed from a pre-cut blank, is positive in action, and strong when opened ready to carry bottles or the like.

A further object is to devise a foldable cardboard carrier with an interlocking bottom and which may be made in various sizes such as to handle two, four, six, and sometimes more bottles or containers.

Still further objects and advantages of the present invention will appear as the description proceeds.

To the accomplishment of the foregoing and related ends, the invention, then, consists of the carrier means hereinafter fully described and particularly pointed out in the claims, the annexed drawings and the following description setting forth in detail certain means for carrying out the invention, such disclosed means illustrating, however, but one of various ways in which the principle of the invention may be used.

Figure 1:
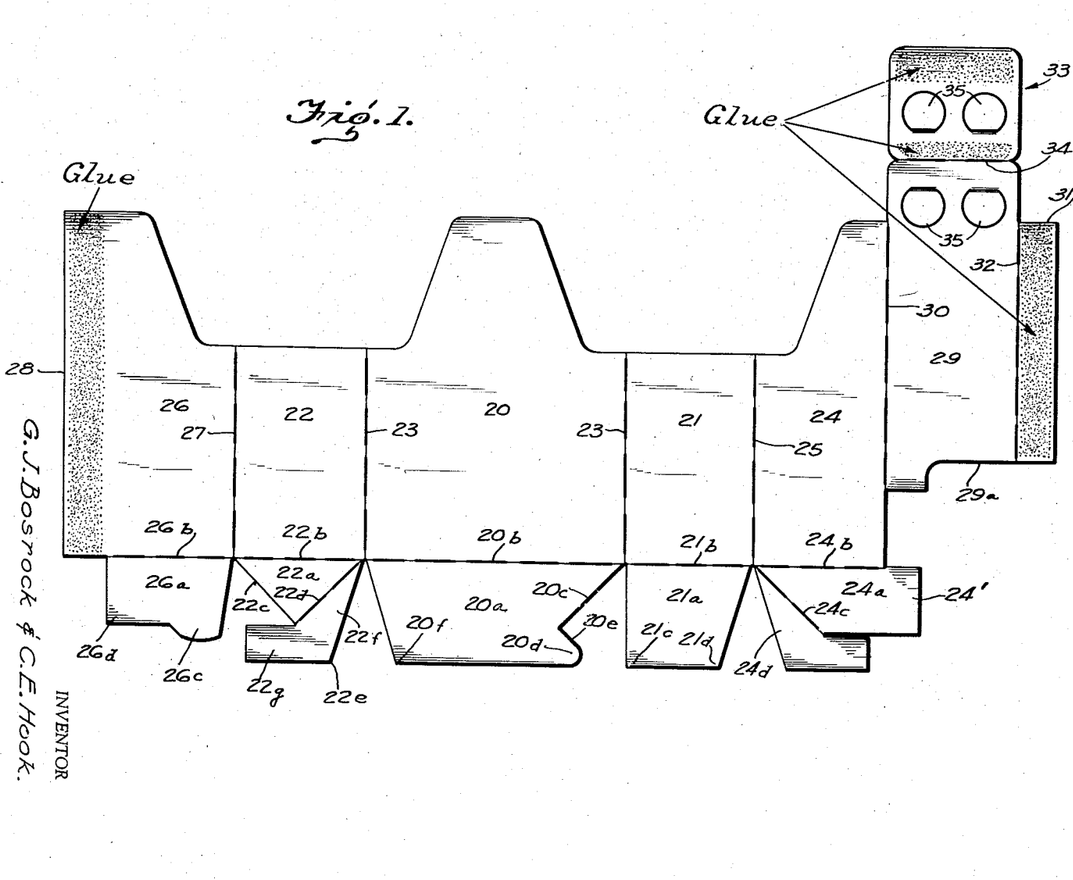
Figure 1 is a plan view of the blank in the flat form in which it is cut, glue being shown on the areas to which it is applied while the blank is in this flat form.

The construction of the carrier can best be described after describing the blank shown in Figure 1. This blank includes one complete side wall panel 20, two complete end wall panels 21 and 22 connected along fold lines 23 to said panel 20, one side wall half panel 24 connected along a fold line 25 with the end panel 21, and another side wall half panel 26 connected along a fold line 27 with the end panel 22. The side wall half panel 26 is provided with an integral extension 28 to overlap and be secured to the other side wall half panel 24 to thereby form a second complete side wall. (See Figures 6, 8 and 9.)

Figure 6:
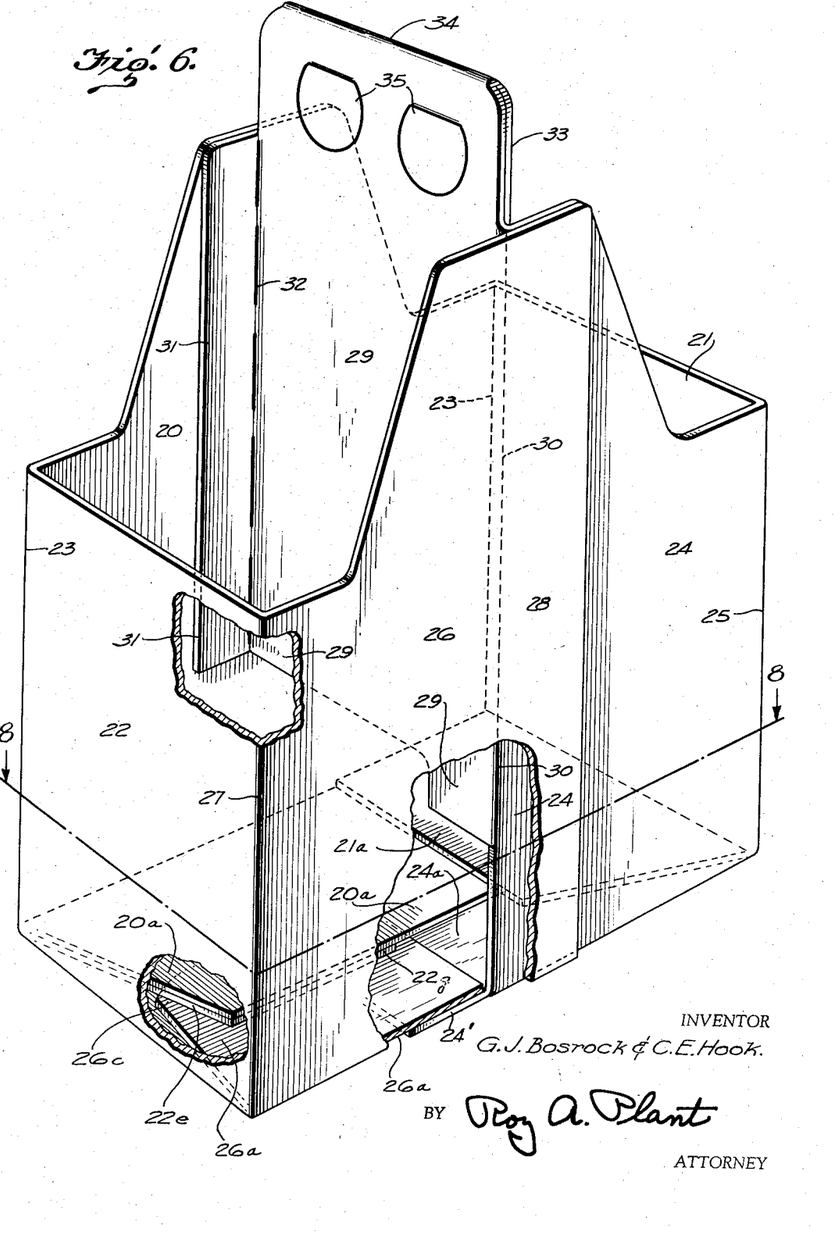
Figure 6 is a perspective view, partly broken away, showing the carrier opened for use, and with some of the bottom flaps slightly raised for clarity of illustration.
Figure 7:
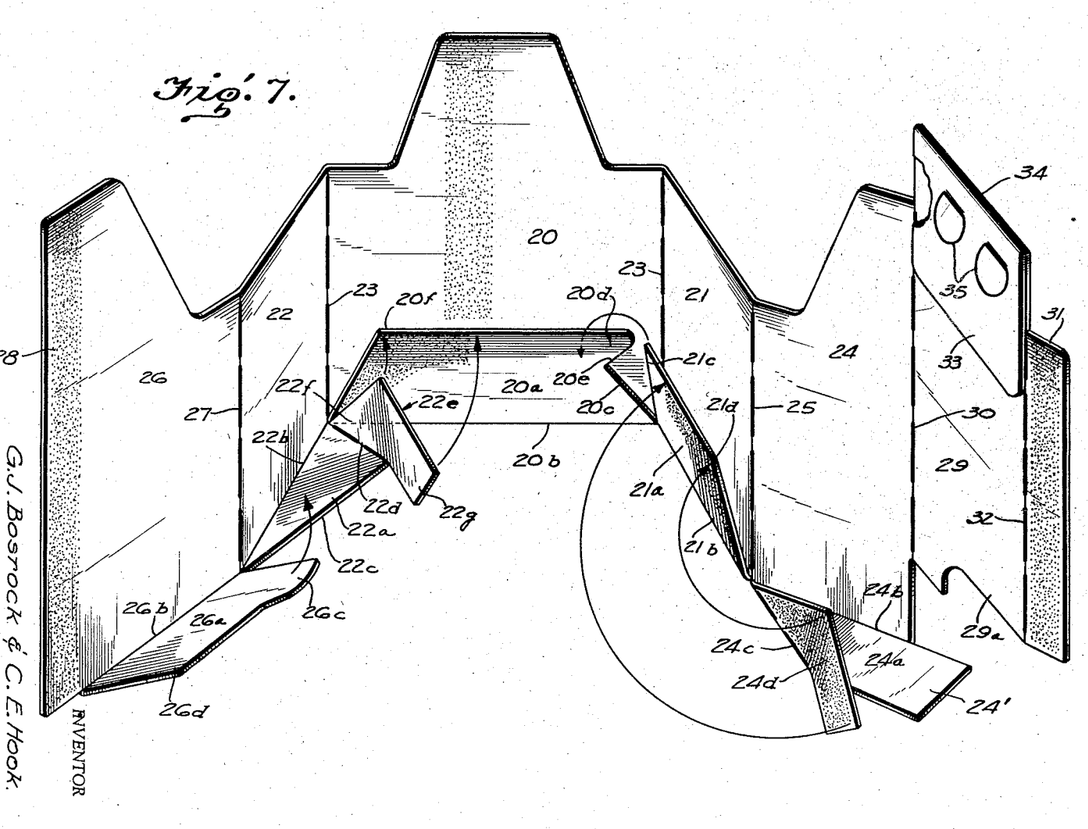
Figure 7 is a perspective view as if the glued areas had been torn apart and the various panels and flaps disposed in abnormal positions, for better understanding of the positions which the various flaps take in the finished carrier.

A partition panel 29 is joined along a fold line 30 to the side wall panel 24 and is provided with an integral extension 31 having a fold line 32 and adapted to be secured against the side wall panel 20 as seen in Figure 6. The lower end 29a of the partition panel 29 is upwardly offset from the lower edges of the panels 20, 21, 22, 24 and 26 to clear a bottom flap hereinafter described (see Figure 3) during folding and gluing of the blank to form the carrier. The upper end of the partition panel 29 is provided with an integral extension 33 and with a fold line 34 upon which to downwardly fold said extension to form a two-ply carrying handle (see Figures 2, 3 and 6). Both the upper end of the partition panel 29 and its extension 33 are formed with cut-outs 35 to register and provide finger openings. These cut-outs 35 may be of tab form with the hinge of same at the top to provide a thicker and smoother surface for finger gripping as shown.

One bottom flap 20a is joined along a fold line 20b to the lower edge of the side wall panel 20 and extends throughout the length of said lower edge; a second bottom flap 21a is joined along a fold line 21b to the lower edge of the end panel 21 and extends throughout the length of this edge; a third bottom panel 22a is joined along a fold line 22b to the lower edge of the end panel 22 and extends throughout the length of this edge; a fourth bottom flap 24a is joined along a fold line 24b to the lower edge of the side wall half panel 24 and not only extends throughout the length of this edge but projects beyond it at 24'; and a fifth bottom flap 26a is joined along a fold line 26b to the lower edge of the side wall half panel 26, The end edge 20c of the one bottom flap 20a, toward the bottom flap 21a, is cut at a 45° angle to the fold line 20b. The end portion of this edge 20c, remote from the fold line 20b, is provided with an integral nose 20d which projects toward the bottom flap 21a, the inner edge 20e of said nose being preferably at a right angle to said edge 20c. The corner 20f of the flap 20a remote from the nose 20d is preferably somewhat obtuse—angular.

The shape of the second bottom flap 21a is relatively unimportant but this flap is preferably formed with one substantially right-angular corner 21c and with one obtuse angular corner 21d.

The third bottom flap 22a is triangular with its end edges 22c and 22d each at a 45° angle to the fold line 22b, the edge 22d being defined by a fold line. This edge 22d is provided with an integral extension 22e to be upwardly folded and secured against the lower side of the adjacent flap 20a in the completed carrier. The extension 22e is preferably of generally L shape, with one arm 22f of the L joined to the flap edge 22d and substantially triangular, and with the other leg 22g of the L parallel with the fold line 22b and projecting toward the flap 26a.

The fourth bottom flap 24a has an inner end edge 24c at a 45° angle to the fold line 24b and defined by a fold line. Integral with this edge 24c, there is an extension 24d which is preferably of the same shape as the extension 22e but reversed. The extension 24d is to be upwardly folded and secured against the lower side of the adjacent bottom flap 21a in the completed article.

The fifth bottom flap 26a is formed with an integral nose 26c, at the corner thereof toward the flap 22a and remote from the fold line 26b, said nose 26c projecting away from said fold line 26b. The outer corner 26d of the flap 26a is preferably right-angular.

Figures 2, 5:
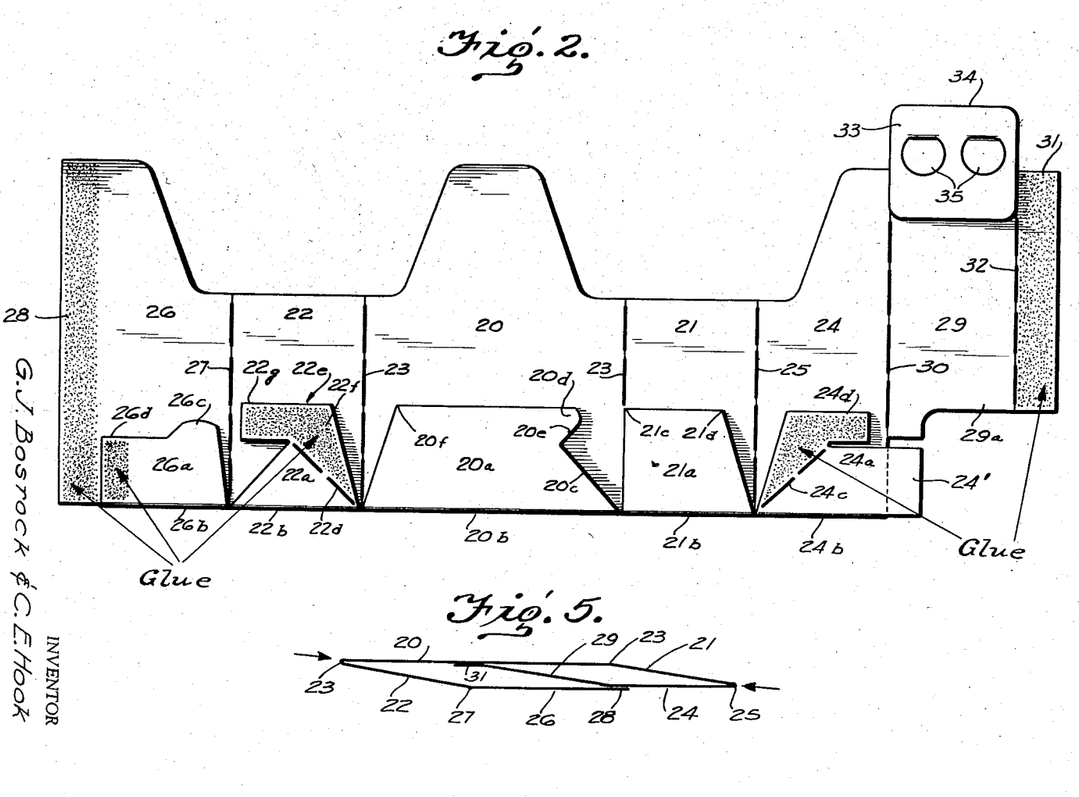
Figure 2 is a plan view showing the handle and bottom flaps folded onto the blank and glue applied to other areas.
Figure 5 is a diagrammatic top view of the folded carrier of Figure 4, certain glued areas, however, being shown separated, and with arrows showing the direction to apply unfolding force to the carrier.
Figure 3:
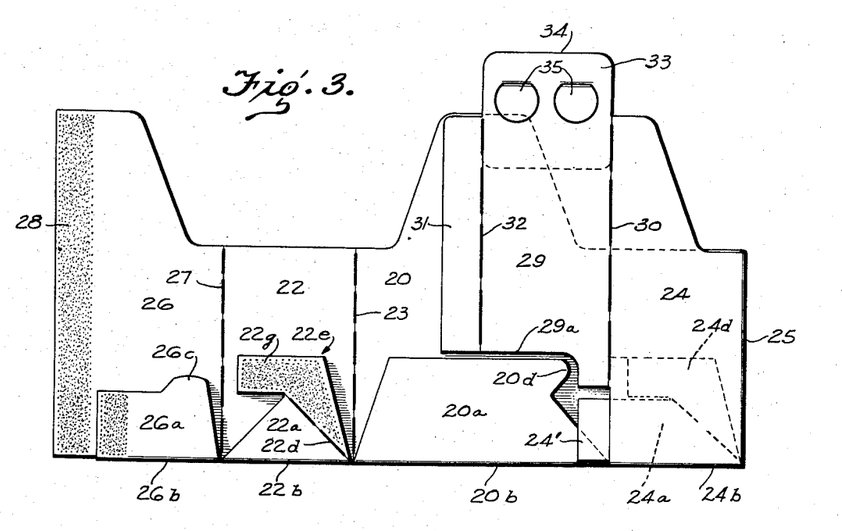
Figure 3 is a plan view showing the right hand portion of Figure 2 folded inwardly.
Figure 4:
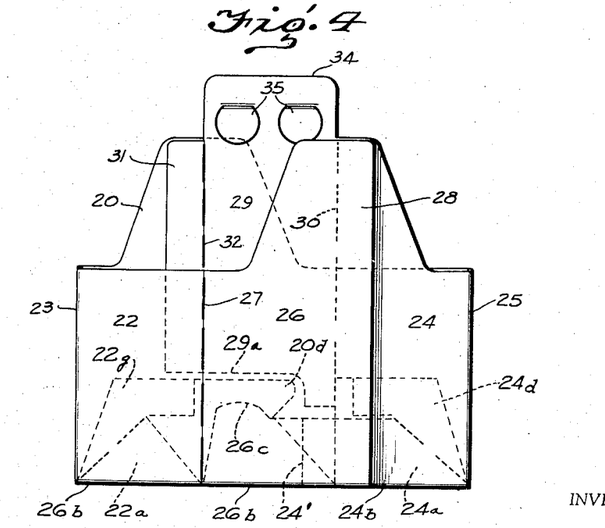
Figure 4 is a similar view showing the left hand portion of Figure 3 folded inwardly, completing, when glued, the construction of the carrier in a folded-flat condition.

To form the carrier from the blank of Figure 1, only a few simple machine operations are required. First, glue is applied to the extensions 28, 31 and 33 as seen in Figure 1. Then, handle extension 33 is folded downwardly and all of the bottom flaps 20a, 21a, 22a, 24a and 26a are folded upwardly as seen in Figure 2 and glue is applied to the extensions 22e and 24d, and a side portion of 26a as seen in Figure 2. Next the side wall half panel 24 and partition panel 29 are inwardly folded, as a unit, on the fold line 25 as shown in Figure 3. This operation glues the extension 31 of the partition panel 29 to the side wall panel 20 and glues the extension 24d of the bottom flap 24a to the adjacent bottom flap 21a. Finally, the side wall half panel 26 and end wall panel 22 are inwardly folded, as a unit, on the fold line 23 as seen in Figure 4. This operation glues the extension 28 of the side wall half panel 26 to the other side wall half panel 24, glues the extension 22e of the bottom flap 22a to the adjacent end of the bottom panel 20a and glues the bottom flap 26a to the extension 24' of the flap 24a.

Figure 8:
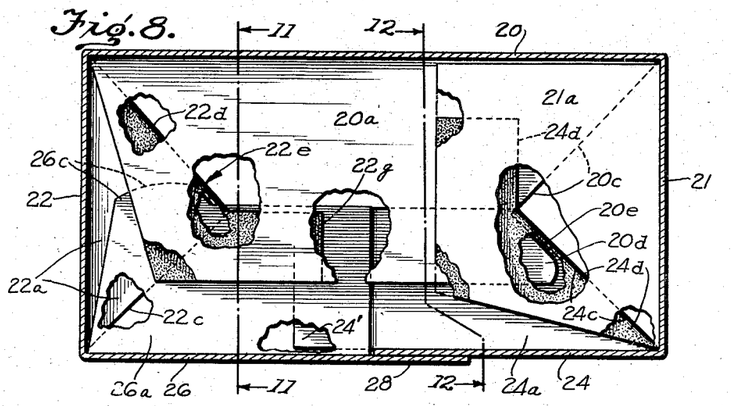
Figure 8 is a horizontal sectional view on line 8—8 of Figure 6, looking in the direction of the arrows, portions of various elements being broken away to show subjacent elements.
Figure 9:
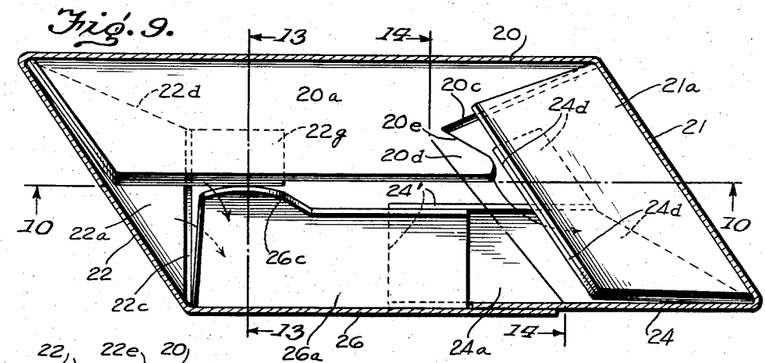
Figure 9 is a view similar to Figure 8 but showing the carrier partly collapsed and the various bottom flaps in the inclined positions which they then assume.
Figure 10:
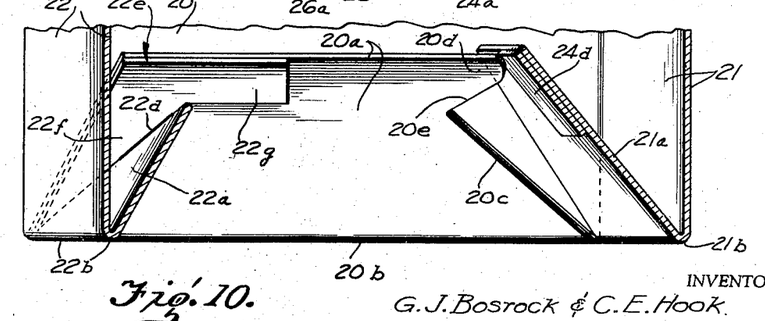
Figure 10 is a fragmentary longitudinal sectional view on line 10—10 of Figure 9, looking in the direction of the arrows.
Figures 11, 12:
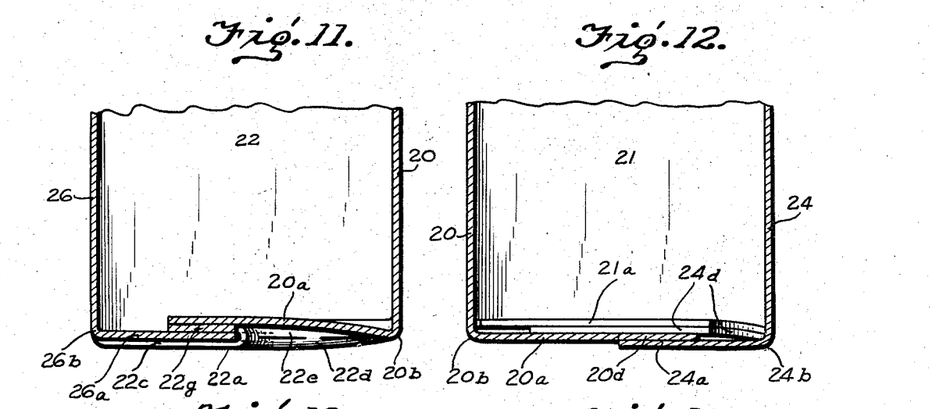
Figures 11 and 12 are transverse sectional views on lines 11—11 and 12—12 of the fully opened carrier bottom of Figure 8, looking in the direction of the arrows.
Figures 13, 14:
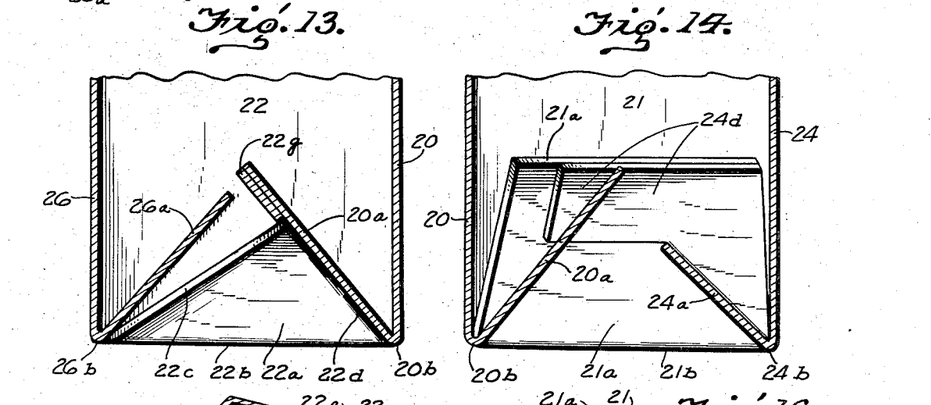
Figures 13 and 14 are similar views on lines 13—13 and 14—14 of Figure 9, looking in the direction of the arrows.
Figure 15:
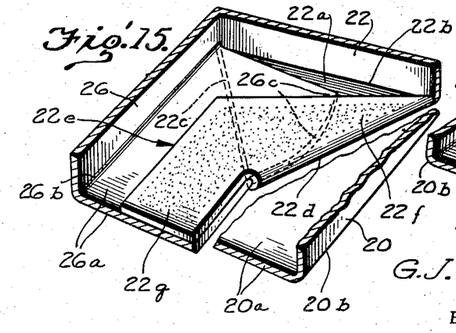
Figure 15 is a fragmentary perspective view as if looking toward the left end of the carrier in Figures 6 and 8.
Figure 16:
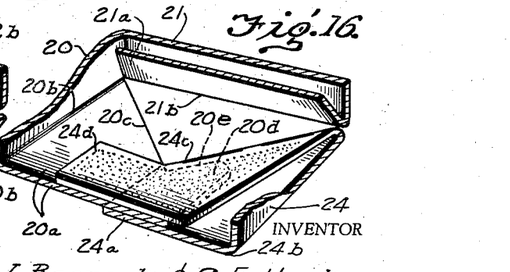
Figure 16 is a similar view as if looking toward the right end of the carrier shown in Figures 6 and 8.

A carrier is thus formed in folded-flat condition as seen in Figure 4 and also diagrammatically illustrated from the top in Figure 5. To open this folded structure for use, it is simply necessary to simultaneously press inwardly on the acute angular corners as indicated by the arrows of Figure 5. The structure is thus changed from the shape of a flat parallelogram in plan view to that of a rectangle, with the various elements operatively related and interlinked as shown in Figure 6. During this opening of the folded structure, the various bottom flaps 20a, 21a, 22a, 24a, and 26a swing downwardly into a positive interengaging cooperative relation and form an unusually strong bottom construction. In this bottom construction the nose 20d of the flap 20a is received in the fold between the flap 24a and the folded extension 24d, of this flap, as seen in Figures 8, 12 and 16. Also, the nose 26c of the flap 26a is received between the flap 22a and its folded extension 22e as seen in Figures 8, 11 and 15. Interlocking of bottom elements is thus attained, insuring a very strong bottom construction.

It will be seen from the foregoing that an extremely strong and very novel and advantageous construction has been provided. A plurality of the carriers in flat condition may be stacked in small space and kept on hand in any bottling plant or store selling bottled products. A number of these carriers may be opened whenever desired and filled for display and sale. After any sale, when the carrier is returned with the empty bottles, the bottles may be removed and the carrier re-folded and placed on the stack for further use. While directional terms such as "top," "bottom," et cetera, have been used throughout this specification, such terms have been used to facilitate description of the invention in its normal position of use, and accordingly such terms are not to be considered as a limitation upon this invention.

Other modes of applying the principle of our invention may be employed instead of the one explained, change being made as regards the apparatus herein disclosed, provided the means stated by any of the following claims or the equivalent of such stated means be employed.

We therefore particularly point out and distinctly claim as our invention:

1. A carrier-forming blank comprising one complete side wall panel, two complete end wall panels joined to vertical edges of said one side wall panel, two side wall half panels joined to vertical edges of said end wall panels respectively, one of said side wall half panels having an extension to overlap and be secured to the other of said side wall half panels to thereby form a second side wall, one bottom flap joined to the lower edge of said one complete side wall panel, a second bottom flap joined to the lower edge of one of said complete end wall panels, a third bottom flap joined to the lower edge of the other of said complete end wall panels, a fourth bottom flap joined to the lower edge of one of said side wall half panels, and a fifth bottom flap joined to the lower edge of the other of said side wall half panels; one of said fourth and fifth bottom flaps being provided with an integral extension to lap onto and be secured against the other of these two flaps; the end edge of said one bottom flap adjacent said second bottom flap being disposed at a substantially 45° angle to the lower edge of said one complete side wall panel and having an integral nose projecting toward said second bottom flap and beyond said angularly projecting portion of said one end edge at the end thereof remote from said lower edge of said one complete side wall panel; said third bottom flap being triangular and having two end edges at substantially 45° to the lower edge of said other of said complete end panels, one of these end edges being disposed toward said one bottom flap and having an integral extension to be folded and secured against the lower side of said one bottom flap; the end edge of said fourth bottom flap toward said second bottom flap being disposed at substantially a 45° angle to the lower edge of the contiguous side wall half panel and having an integral extension to be folded and secured against the lower side of said second bottom flap; the corner of said fifth bottom flap toward said third bottom flap and remote from the contiguous side wall half panel being provided with an integral nose which projects away from the last mentioned side wall half panel; said nose of said one bottom flap being receivable in the fold between said fourth bottom flap and the extension of the latter in the completed carrier; said nose of said fifth bottom flap being receivable in the fold between said third bottom flap and the triangular extension of the latter in the completed carrier.

2. A structure as specified in claim 1; a partition panel joined to the outer vertical edge of said other of said side wall half panels, the outer vertical edge of said partition panel having a flap to be secured against said one complete side wall panel, said partition and panel having an upward extension to be folded onto said partition panel to form a two-ply carrying handle, said partition panel and its upward extension having finger cut-outs.

3. A carrier comprising one one-piece side wall, a second side wall formed from two side wall halves secured together, two end walls integral with said first and second side walls, one bottom flap integral with said one side wall, a second bottom flap integral with one of said end walls, a third bottom flap integral with the other of said end walls, a fourth bottom flap integral with one of said side wall halves, and a fifth bottom flap integral with the other of said side wall halves, said fourth and fifth bottom flaps being overlapped and secured together; the end edge of said one bottom flap toward said one of said end walls being disposed at an angle of substantially 45° to said one of said end walls and having an integral nose projecting toward said one of said end walls, said nose being remote from said one side wall; said third bottom flap being triangular and having two end edges at substantially 45° to the other of said end walls, one of these end edges being disposed toward said one side wall and being provided with an upwardly folded extension secured against the lower side of said one bottom flap; said fourth bottom flap having an end edge disposed toward said one of said end walls and at substantially a 45° angle to said one of said end walls, this end edge being provided with an upwardly folded extension which is secured against the lower side of said second bottom flap; the corner at the outer edge of said fifth bottom flap at its edge toward said other of said end walls being provided with an outwardly extending integral nose; the aforesaid nose of said one bottom flap being received in the fold between said fourth bottom flap and the overlying extension of this fourth bottom flap; the nose of said fifth bottom flap being received in the fold between said third bottom flap and the overlying extension of this third bottom flap; whereby the carrier may be folded flat and the bottom flaps will then project upwardly.

4. A structure as specified in claim 3; together with a transverse partition extending from one of said side walls to the other thereof, said partition having a reinforced upper end provided with at least one finger opening.

References Cited in the file of this patent
UNITED STATES PATENTS

| | | |
|---|---|---|
| 1,151,821 | Raynaud | Aug. 31, 1915 |
| 2,273,266 | Himes | Feb. 17, 1942 |
| 2,436,553 | Couch | Feb. 24, 1948 |
| 2,586,886 | Tyrseck | Feb. 26, 1952 |
| 2,693,297 | Bolding | Nov. 2, 1954 |
| 2,741,399 | Arneson | Apr. 10, 1956 |

FOREIGN PATENTS

| | | |
|---|---|---|
| 485,348 | Italy | Oct. 10, 1953 |

UNITED STATES PATENT OFFICE
CERTIFICATE OF CORRECTION

Patent No. 2,881,946                         April 14, 1959

George J. Bosrock et al.

It is hereby certified that error appears in the printed specification of the above numbered patent requiring correction and that the said Letters Patent should read as corrected below.

Column 1, line 39, for "shortcoming" read -- shortcomings --; column 4, line 44, for "said one end" read -- said end --; line 71, for "partition and panel" read -- partition panel --.

Signed and sealed this 25th day of August 1959.

(SEAL)
Attest:

KARL H. AXLINE
Attesting Officer

ROBERT C. WATSON
Commissioner of Patents